United States Patent [19]

Chung

[11] Patent Number: 5,617,950
[45] Date of Patent: Apr. 8, 1997

[54] BOOK-SHAPED CD CONTAINER

[75] Inventor: M. F. Chung, Taichung, Taiwan

[73] Assignee: Min Shin Plastic Ind. Co., Ltd., Taichung, Taiwan

[21] Appl. No.: 664,550

[22] Filed: Jun. 17, 1996

[51] Int. Cl.$^6$ .................................................. B65D 85/57
[52] U.S. Cl. ........................ 206/308.1; 206/445; 206/309
[58] Field of Search ................................. 206/425, 308.1, 206/308.3, 309, 310, 311, 312, 313, 232, 445, 450

[56] References Cited

U.S. PATENT DOCUMENTS

| | | | |
|---|---|---|---|
| 4,875,743 | 10/1989 | Gelardi et al. | 206/308.1 X |
| 4,998,618 | 3/1991 | Borgions | 206/308.1 X |
| 5,099,995 | 3/1992 | Karakane et al. | 206/312 X |
| 5,547,078 | 8/1996 | Iida | 206/309 X |

*Primary Examiner*—Jacob K. Ackun
*Attorney, Agent, or Firm*—Browdy and Neimark

[57] ABSTRACT

A book-shaped CD container has an outer case, a groove-divided pivot mount and a groove-divided retaining seat and a plurality of CD receiving plates each of which is pivotally engaged with the pivot mount. The pivot mount and the retaining seat are removably secured to the bottom and top side of the outer case so that the receiving plates can be pivotally extended outwardly out of the outer case or pushed inwardly thereinto for storage selectively one by one. The CD container is of a size of a common dictionary so that it can be carried around with ease and elegance and exhibited in harmony with its surroundings.

11 Claims, 4 Drawing Sheets ced's 5,617,950

BOOK-SHAPED CD CONTAINER

BACKGROUND OF THE INVENTION

The present invention relates to a book-shaped CD container which is equipped with a book-like outer case, a groove-divided pivot mount, a groove-divided retaining seat and a plurality of CD receiving plates. The CD receiving plates are pivotally pulled outwardly and pushed inwardly piece by piece and are firmly retained in place for storage. The book-shaped CD container has a size as large as a common dictionary so that it can be carried with ease and comfortable elegance in one aspect and also be placed in exhibition in a shelter or on a desk in harmony with its surroundings on the other aspect.

Conventional CD containers sold on the markets are generally produced in a circular form or a box form having a handle or a belt attached thereto. They are made in a relatively large size for housing more discs therein. It is a bit awkward to carry such large boxes around when going out. Moreover, the prior art CD storage boxes are not suitable for exhibition arrangement when placed in a living room or housed in a shelter, taking up too much space and not properly conforming to the surroundings.

SUMMARY OF THE INVENTION

Therefore, the primary object of the present invention is to provide a book-shaped CD container which is made in the size of a common dictionary so that it can be carried around with ease and elegance and disposed indoor on a shelter in matching harmony with its surroundings.

Another object of the present invention is to provide a book-shaped CD container which is provided with a groove-divided pivot mount, a retaining seat and a plurality of CD receiving plates that are pivotally assembled together compactly and finely so that the components thereof are not exposed or seen externally at all. Besides, it is made in such a size that it can be easily held or grasped in carrying around.

DETAILED DESCRIPTION OF THE PREFERRED EMBODIMENT

Figure 1:
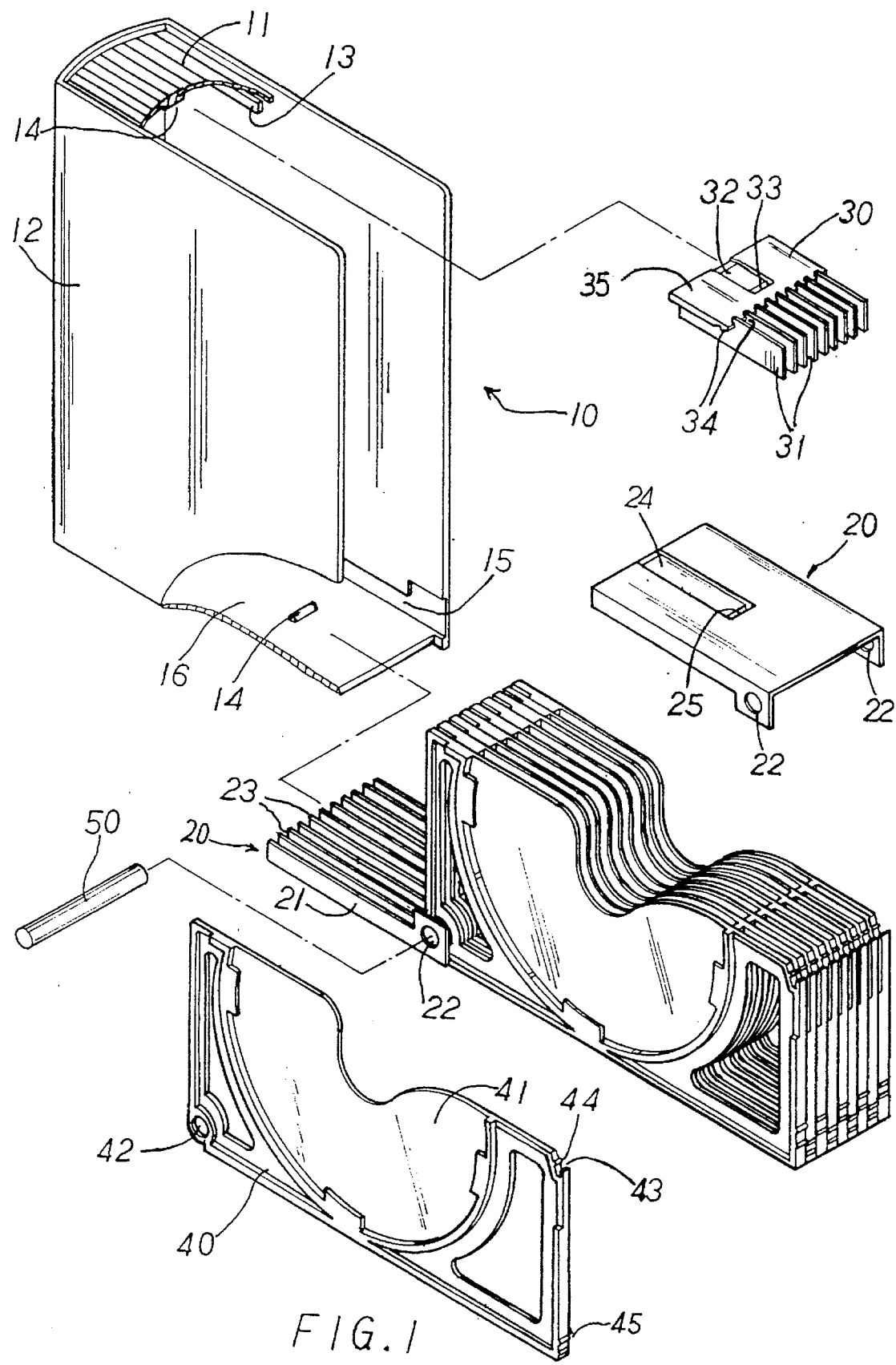
FIG. 1 is a diagram showing the exploded components of the present invention.

Referring to FIG. 1, the CD container of the present invention comprises a book-shaped outer case 10, a groove-divided pivot mount 20, a groove-divided retaining seat 30 and a plurality of CD receiving plates 40.

The book-shaped outer case 10 has a fully-opened front side and a halfly-opened top side with a ceiling portion 11 disposed thereon and a pair of side shelters 12 and a closed bottom 16.

On each of the inner wall of the side shelters 12 and right under the ceiling portion 11 is fixed a guide rib 13. The top surface of the ceiling portion 11 can be attached with a catalouge list and the underside thereof is provided with a slightly bulged retaining protrusion 14. At the foot and on the inner side of each shelter 12 is provided with a guide recess 15. The closed bottom 16 of the outer case 10 is provided with a bulged retaining protrusion 14 at the middle thereof. To the outer face of the rear side of the outer case 10 can be attached a catalouge list.

The groove-divided pivot mount 20 has a pair of parallel side guards 21 each having a joint hole 22 at one end thereof. A plurality of partition walls 23 are disposed in parallel between the guard sides 21. On the underside of the pivot mount 20 is defined a retaining guide groove 24. The retaining guide groove 24 extends inwardly toward the center of the pivot mount 20 with a linear locking gap 25 defined at the inner end thereof. The outer end of the retaining guide groove 24 is slightly slanted initially.

The groove-divided retaining seat 30 has a plurality of downwardly extended partition plates 31 which are parallelly disposed. On the top plate 35, only half length of the partition plates 31 of the retaining seat 30, is disposed a central locking guide groove 32 having a linear gap 33 defined at the inner end thereof. At the outer end of the locking guide groove 32 is slightly sloped. At the frontmost underside edge of the top plate 35 are disposed a plurality of retaining hooks 34, each is spacedly defined in between a pair of the partition plates 31 and also at both the sidemost ends thereof.

A plurality of the CD receiving plates 40 are pivotally engaged with the pivot mount 20 by a pivot shaft 50. Each CD receiving plate 40 having a pivot hole 42 defined at one corner thereof is pivotally secured in place in between a pair of the partition walls 23 in general and also between one side guard 21 and one partition wall 23 of the pivot mount 20 at each side thereof by the pivot shaft 50. The pivot shaft 50 is led through the joint holes 22 of the pivot mount 20 and the pivot holes 42 disposed in alignment with one another when mounted onto the pivot mount 20.

Each CD receiving plate 40 of a rectangular shape has a semi-circular cavity 41 at the central portion thereof for housing part of a compact disc. At the diagonally opposite corner of the pivot hole 42 of the CD receiving plate 40 is disposed a locking recess 43 having a locking protrusion 44 defined adjacent thereto. On the right edge, opposite to the edge next to the pivot hole 42, and near the bottom thereof are defined a pair of pivot protrusions 45. The pivot protrusions 45 defined on the CD receiving plates 40 located in juxtaposition with one another are not placed in alignment with each other so that the neighboring CD receiving plates can be pivoted outwardly without interference with each other.

Figure 2:
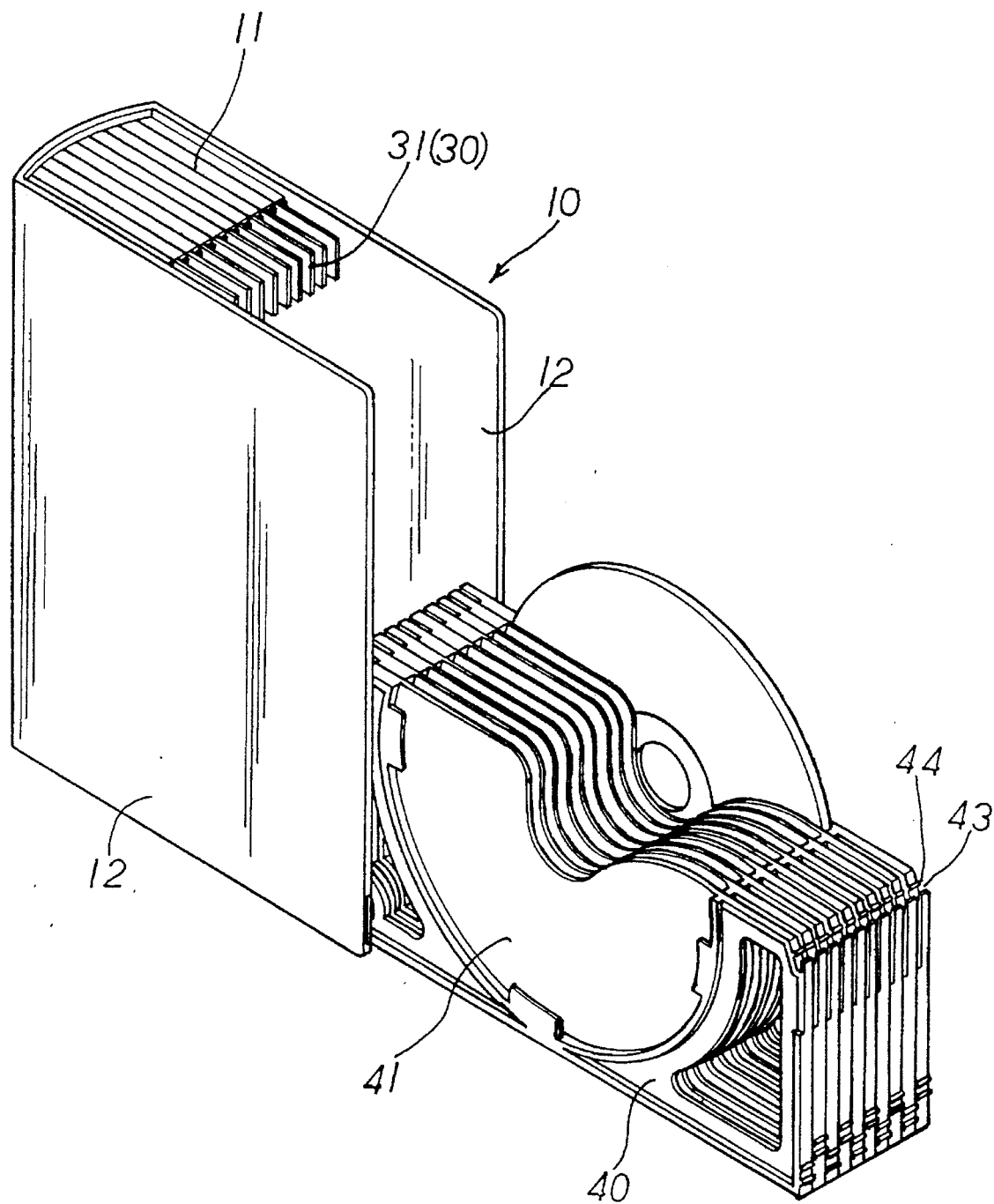
FIG. 2 is a diagram showing the halfly assembled structure of the present invention.

Referring further to FIG. 2, the CD container of the present invention in an opened state is illustrated. The CD receiving plates 40 are pivotally mounted onto the pivot mount 20 by way of a pivot shaft 50 as preceedingly described. Then, the pivot mount 20 is pushed along the guide recesses 15, each defined on the respective side shelter 12, into the outer case 10. In the meanwhile, the retaining protrusion 14 on the surface of the closed bottom 16 of the outer case 10 becomes slidably engaged with the retaining guide groove 24 and further falls into the linear gap 25 at the end of the guide groove 24 so as to lock the pivot mount 20 in place.

In the same manner, the groove-divided retaining seat 30 is engaged with the outer case 10 by pushing the same along the guide ribs 13 defined on the inner faces of the side shelters 12 of the outer case 10. Meanwhile, the retaining protrusion 14 on the face of the ceiling portion 11 becomes slidably engaged with the locking guide groove 32 and finally falls into the linear gap 33 so as to lock the retaining seat 30 firmly in position.

Figure 3:
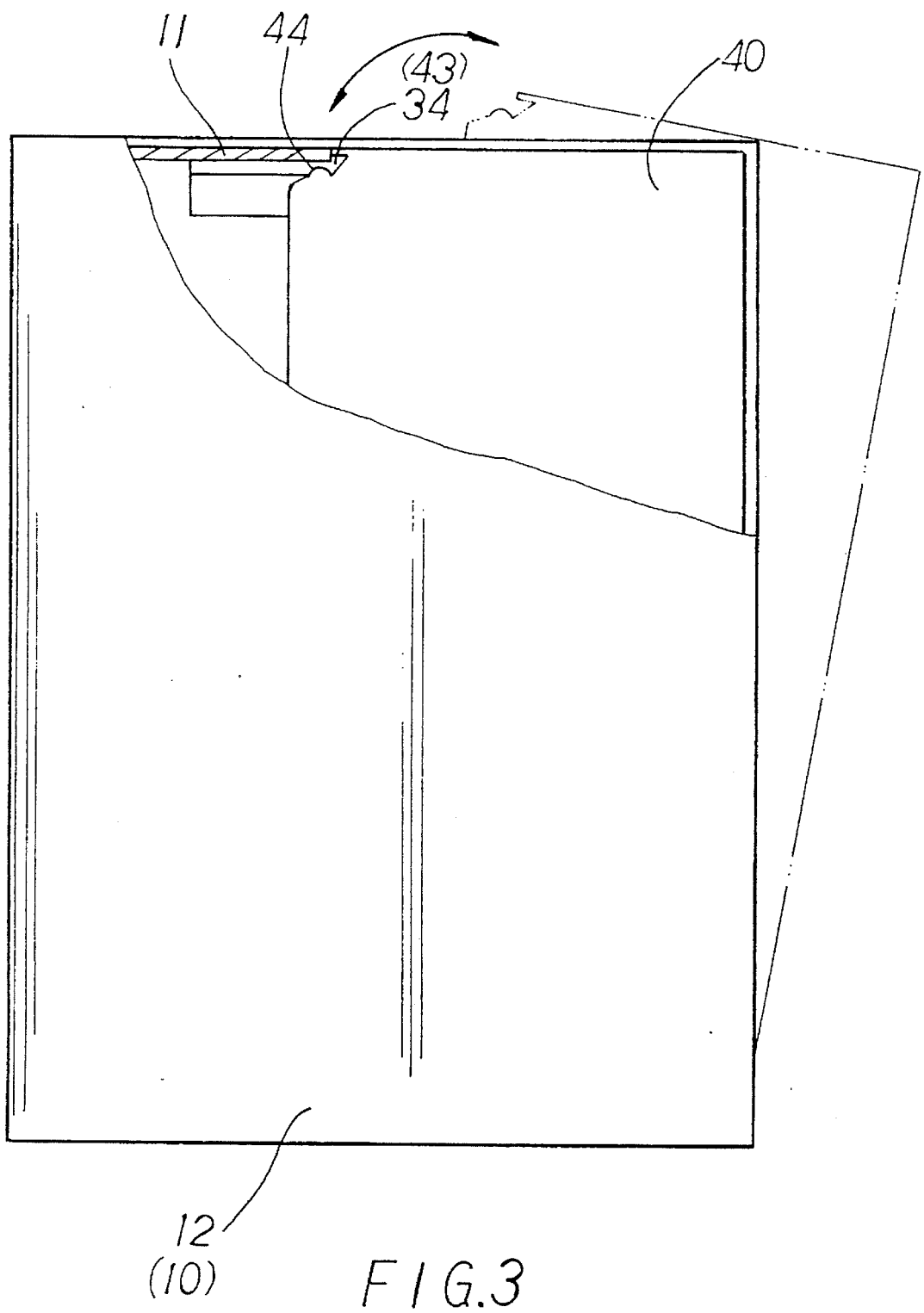
FIG. 3 is a sectional diagram thereof.
Figure 4:
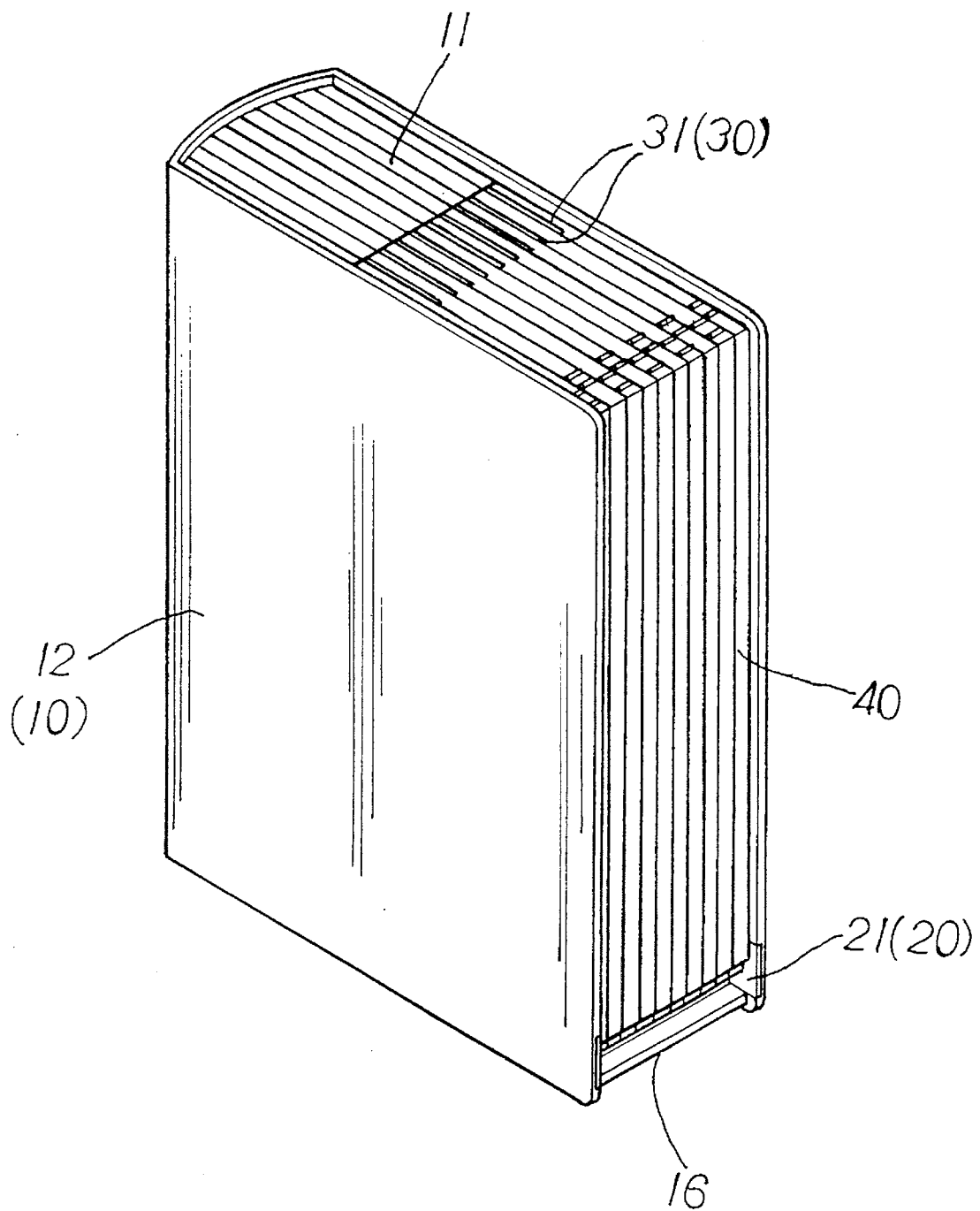
FIG. 4 is a perspective diagram showing the CD container of the present invention.

As further shown in FIG. 3 which is the sectional view of the present invention, when each of the CD receiving plate 40 is pivoted into the outer case 10 one by one, the locking protrusion 44 in each locking recess 43 becomes engaged with the corresponding retaining hook 34 of the retaining seat 30 respectively whereby the CD receiving plates are firmly locked inside the outer case 10 and are pivotally moved outwardly one by one in a selective manner in practical operation.

Moreover, the components of the present invention, such as the grooved-divided pivot mount 20, the groove-divided retaining seat 30 and all the CD receiving plates 40 are conceived well in the outer case 10 so that they will not be exposed externally in one aspect; and the assembled book-shaped CD container of the present invention can be carried around or exhibited with ease and elegance in another aspect.

I claim:

1. A book-shaped CD container for storage video or audio compact discs, comprising:
    a book-shaped outer case having two side shelters, a closed bottom, a partially closed top side having a ceiling portion, a closed rear side and a fully opened front side;
    a groove-divided pivot mount removably engaged with and secured to said closed bottom of said outer case;
    a groove-divided retaining seat removably engaged with and secured to said top ceiling portion of said outer case;
    a plurality of CD receiving plates pivotally disposed in juxtaposition to one another and pivotally engaged with said groove-divided pivot mount by a pivot shaft;
    each said CD receiving plate having a semi-circular cavity at the central portion thereof for storage of a compact disc; and being locked in place to said retaining seat when housed in said outer case and being unlocked when pivoted outwardly for removal of a housed compact disc;
    whereby said CD receiving plates can be selectively pivoted out of said outer case for picking out stored compact discs or pivotally pushed into said outer case for storage.

2. The book-shaped CD container as claimed in claim 1 wherein each of said side shelter of said outer case has an inner face with a guide recess defined at the bottom edge thereof adjacent said closed bottom of said outer case so as to permit said pivot mount to be slidably engaged with said outer case.

3. The book-shaped CD container as claimed in claim 1 wherein said closed bottom of said outer case has a retaining protrusion on the face thereof and said pivot mount has a retaining guide groove having a linear gap defined at the end of said guide groove so that said retaining protrusion can fall into engagement with said linear gap and lock said pivot mount in place to said outer case.

4. The book-shaped CD container as claimed in claim 3 wherein said inner face of each said side shelters of said outer case is provided with a guide rib at the opposite edge of said guide groove of said side shelter, adjacent to said top ceiling portion of said outer case, so that said retaining seat having a top plate and a plurality of parallel partition plates spacedly disposed under said top plate can be removably engaged with said outer case right under said top ceiling portion.

5. The book-shaped CD container as claimed in claim 4 wherein said top plate has a central locking guide groove on the face thereof with a linear gap defined at the end of said guide groove and said top ceiling portion is provided with a retaining protrusion on one face thereof so that said locking guide groove can be engaged with said retaining protrusion which falls into said linear gap of said guide groove, securing said retaining seat in place to said outer case.

6. The book-shaped CD container as claimed in claim 5 wherein said pivot mount has a pair of side guards and a plurality of parallelly spaced partition walls disposed therebetween; each of said side guard is provided with a joint hole; each of said CD receiving plate is provided with a pivot hole at one corner thereof so that a pivot shaft can be led through said joint holes and each said pivot hole in assembly, permitting said CD receiving plates to be pivotally engaged with said pivot mount; at the diagonally opposite corner of said pivot hole of each said CD receiving plate is disposed a locking recess having a locking protrusion adjacent thereto; said top plate of said retaining seat is provided with a plurality of spaced locking hooks in corresponding alignment with said locking protrusions of said CD receiving plates respectively so that said CD receiving plates can be locked in place in said outer case.

7. The book-shaped CD container as claimed in claimed in claim 1 wherein said inner face of each said side shelters of said outer case is provided with a guide rib at the opposite edge of said guide groove of said side shelter, adjacent to said top ceiling portion of said outer case, so that said retaining seat having a top plate and a plurality of parallel partition plates spacedly disposed under said top plate can be removably engaged with said outer case right under said top ceiling portion.

8. The book-shaped CD container as claimed in claim 7 wherein said top plate has a central locking guide groove on the face thereof with a linear gap defined at the end of said guide groove and said top ceiling portion is provided with a retaining protrusion on one face thereof so that said locking guide groove can be engaged with said retaining protrusion which falls into said linear gap of said guide groove, securing said retaining seat in place to said outer case.

9. The book-shaped CD container as claimed in claim 8 wherein said pivot mount has a pair of side guards and a plurality of parallelly spaced partition walls disposed therebetween: each of said side guard is provided with a joint hole: each of said side CD receiving plate is provided with a pivot hole at one corner thereof so that a pivot shaft can be led through said joint holes and each said pivot hole in assembly, permitting said CD receiving plates to be pivotally engaged with said pivot mount; at the diagonally opposite corner of said pivot hole of each said CD receiving plate is disposed a locking recess having a locking protrusion adjacent thereto: said top plate of said retaining seat is provided with a plurality of spaced locking hooks in corresponding alignment with said locking protrusions of said CD receiving plates respectively so that said CD receiving plates can be locked in place in said outer case.

10. The book-shaped CD container as claimed in claim 1 wherein said top plate has a central locking guide groove on the face thereof with a linear gap defined at the end of said guide groove and said top ceiling portion is provided with a retaining protrusion on one face thereof so that said locking guide groove can be engaged with said retaining protrusion which falls into said linear gap of said guide groove, securing said retaining seat in place to said outer case.

11. The book-shaped CD container as claimed in claim 1 wherein said pivot mount has a pair of side guards and a plurality of parallelly spaced partition walls disposed therebetween: each of said side guard is provided with a joint hole: each of said side CD receiving plate is provided with a pivot hole at one corner thereof so that a pivot shaft can be led through said joint holes and each said pivot hole in assembly, permitting said CD receiving plates to be pivotally engaged with said pivot mount; at the diagonally opposite corner of said pivot hole of each said CD receiving plate is disposed a locking recess having a locking protrusion adjacent thereto: said top plate of said retaining seat is provided with a plurality of spaced locking hooks in corresponding alignment with said locking protrusions of said CD receiving plates respectively so that said CD receiving plates can be locked in place in said outer case.

* * * * *